United States Patent
Piekarz

(10) Patent No.: US 7,298,322 B2
(45) Date of Patent: Nov. 20, 2007

(54) NAVIGATION DEVICE WHICH SWITCHES THE FEED TO AN INTERFACE OF A CENTRAL PROCESSING UNIT BETWEEN DIGITAL POSITION INFORMATION OBTAINED WITH AN INTERNAL ANTENNA OR DIGITAL POSITION INFORMATION OBTAINED WITH AN EXTERNAL ANTENNA

(75) Inventor: Roman Piekarz, Mielec (PL)

(73) Assignee: Bury Sp. Z.o.o., Mielec (PL)

( * ) Notice: Subject to any disclaimer, the term of this patent is extended or adjusted under 35 U.S.C. 154(b) by 0 days.

(21) Appl. No.: 11/532,200

(22) Filed: Sep. 15, 2006

(65) Prior Publication Data

US 2007/0063892 A1 Mar. 22, 2007

(30) Foreign Application Priority Data

Sep. 16, 2005 (DE) .................... 10 2005 044 497

(51) Int. Cl.
*G01S 5/14* (2006.01)
(52) U.S. Cl. ............................. 342/357.12; 342/357.06
(58) Field of Classification Search ........... 342/357.06, 342/357.12
See application file for complete search history.

(56) References Cited

U.S. PATENT DOCUMENTS

| 6,384,777 | B1 | 5/2002 | McBurney et al. .... 342/357.12 |
| 6,756,859 | B2* | 6/2004 | Kodim ........................ 333/101 |
| 2002/0068549 | A1 | 6/2002 | Tendler ....................... 455/414 |
| 2003/0232595 | A1* | 12/2003 | Baker et al. ................ 455/11.1 |
| 2004/0181328 | A1 | 9/2004 | Davidson et al. ............. 701/36 |
| 2005/0043888 | A1* | 2/2005 | Kang ......................... 701/213 |
| 2005/0162312 | A1 | 7/2005 | Riday ..................... 342/357.13 |

FOREIGN PATENT DOCUMENTS

| DE | 10 2004 013 377 A1 | 8/2005 |
| DE | 10 2004 036 564 A1 | 3/2006 |
| DE | 10 2005 048 133 A1 | 5/2006 |
| EP | 1 508 814 A2 * | 2/2005 |
| JP | 2002-196065 | 10/2002 |
| WO | WO 2005/086459 A1 | 9/2005 |

OTHER PUBLICATIONS

English translation of JP 2002-196065 A.*
European Patent Office Search Report, Nov. 24, 2006; pp. 1-3.

\* cited by examiner

*Primary Examiner*—Thomas H. Tarcza
*Assistant Examiner*—Fred H. Mull
(74) *Attorney, Agent, or Firm*—Whitham Curtis Christofferson & Cook, PC

(57) ABSTRACT

A navigation device (1) with a housing (2), an antenna (3), forming a part of the device (1), for position signals, an internal conversion unit (11) for evaluating and converting the received position signals into digital position information, a central processing unit (4) with a navigation interface (12) for receiving and for processing the digital position information, and with a data input (8) via which an external receiving antenna (in 9) with an external conversion unit (in 9) can be connected for generating digital position information, provides for preferred processing of externally formed digital position information in a very simple manner in that the processing unit (4) is preceded by a switching device (13), the output of which is connected to the navigation interface (12) and which switches from the internal conversion unit (11) to the data input (8) when externally formed digital position information reaches the device (1) via the data input (8).

4 Claims, 1 Drawing Sheet

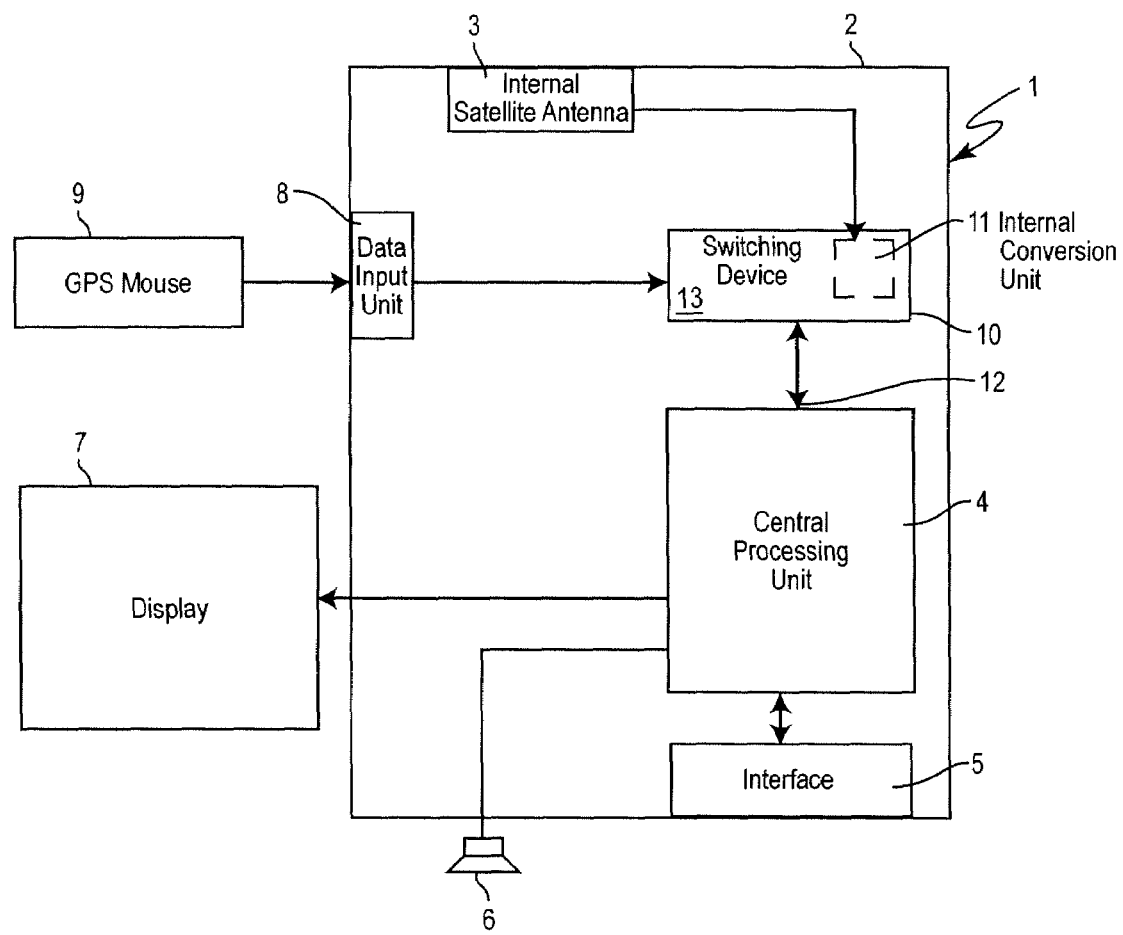

NAVIGATION DEVICE WHICH SWITCHES THE FEED TO AN INTERFACE OF A CENTRAL PROCESSING UNIT BETWEEN DIGITAL POSITION INFORMATION OBTAINED WITH AN INTERNAL ANTENNA OR DIGITAL POSITION INFORMATION OBTAINED WITH AN EXTERNAL ANTENNA

BACKGROUND

The invention relates to a navigation device with a housing, an antenna, forming a part of the device, for position signals, an internal conversion unit for evaluating and converting the received position signals into digital position information, a central processing unit with a navigation interface for receiving and for processing the digital position information and with a data input via which an external receiving antenna with an external conversion unit can be connected for generating digital position information.

Such navigation devices are known. Due to their internal antenna for the position signals, particularly satellite position signals (in the GPS or GLONASS systems current at the present time or in future systems such as, for example, the intended GALILEO system, the navigation devices can be operated autonomously. Accordingly, the use of such navigation devices is also possible in motor vehicles which are not equipped with a corresponding satellite antenna, or outside a motor vehicle such as, for example, when riding bicycles, hiking, etc. The problem with autonomously using the navigation device in a motor vehicle is, however, that due to the shielding effect of the metallic motor vehicle chassis, the internal antenna, that is to say the device itself, must be arranged at a position which, on the one hand, provides for adequate reception of the high-frequency satellite position signals and, on the other hand, for good legibility of indications on a display normally present. The possible compromises existing for this purpose normally do not allow optimum reception so that, particularly in difficult reception situations due to shading, etc., the required updating of the current position sometimes does not take place.

It is known, therefore, to use an external satellite antenna which is combined with a conversion unit, which is also external, in order to evaluate the high-frequency satellite position signals and to convert them into digital position information. This position information can be transferred without interference to the navigation device when the navigation device is equipped with a corresponding data input, preferably in the form of a USB input, in order to receive the digital position information via this data input.

Such a satellite antenna with its own conversion unit (for the GPS system) is also called GPS mouse.

In the known navigation device of the type initially mentioned, the digital position information formed by evaluation and conversion can thus be present which has been received by the internal satellite antenna or by the external satellite antenna. It is known to conduct the digital position information formed to two interfaces of the central processing unit, wherein the central processing unit preferably processes the input signal at the interface allocated to the external satellite antenna. Since two interfaces of the central processing unit must be reserved for the digital position information, a standard use of this central processing unit provided for the reception of digital position information at only one interface is not possible.

As an alternative, it is known, in principle, to provide high-frequency antenna signals, for example broadcast signals, with an antenna belonging to the device and an external antenna connected to an antenna input. In this arrangement, the switch-over is performed in such a manner that the high-frequency signal of the external antenna is converted and processed when a connection has been made to the antenna input. The problem in this arrangement is the required careful conduction of high-frequency signals to the antenna input when the external antenna is arranged at some distance to the device itself, as is frequently appropriate.

SUMMARY

The present invention is based on the object of arranging a navigation device of the type initially mentioned in such a manner that it can process position signals received with an antenna belonging to the device or preferably position information received by an external receiving antenna and converted by an external conversion unit in simplified form.

According to the invention, to achieve this object, a navigation device of the type initially mentioned is characterized by the fact that the processing unit is preceded by a switching device, the output of which is connected to the navigation interface and which switches from the internal conversion unit to the data input when externally formed digital position information reaches the device via the data input.

According to the invention, the central processing unit can thus remain unchanged compared with its standard use since the digital position information reaches the processing unit in the only navigation interface. In the preceding switching device, the switch-over for the digital position information already converted takes place which is usually conducted to the navigation interface as a serial signal. The switch-over is effected in such a manner that the digital position information received via the external receiving antenna, preferably satellite antenna, and converted by the external conversion ion is preferably processed, i.e. the signals received from the internal receiving antenna are suppressed when the converted input signals of the external receiving antennas reach the data input of the navigation device.

In a particularly preferred embodiment of the invention, the switching device is constructed as part of a preprocessing unit which also comprises the internal conversion unit. In other words, the switching device is combined with the internal conversion unit to form a common processing stage (preprocessing unit).

The navigation device according to the invention thus allows a so-called GPS mouse to be connected which, in a motor vehicle, for example, is preferably mounted close to the rear window or even on the outside of the motor vehicle whereas the navigation device must be arranged within range of visibility of the driver of the vehicle so that the driver can read the display of the navigation device. The not inconsiderable length of the line between the GPS mouse and the navigation device is uncritical because low-frequency data signals are transmitted via this line.

Incidentally, this similarly also applies when the GPS mouse provides for wireless data transmission (for example in accordance with the Bluetooth standard) and the navigation device has a corresponding receiver which thus forms the data input.

DESCRIPTION OF THE DRAWING

In the text which follows, the invention will be explained in greater detail with reference to an illustrative embodiment shown in the block diagram shown in the FIGURE.

DETAILED DESCRIPTION

The navigation device 1 is accommodated in a housing 2 in which an internal satellite antenna 3 is located as receiving antenna.

Into the navigation device 1, target data can be input via input units (not shown) which are compared with current position data in order to calculate by means of a stored digital map (not shown) a route which may be optimized by means of predetermined parameters. These functions are executed in a central processing unit 4 which receives via an interface 5 the data of the operating unit and possibly other relevant data such as traffic messages received by radio reception, updated digital maps, etc.

The calculated route is output via a loudspeaker 6 and/or a display 7 in the form of driving instructions.

It is possible that the loudspeaker 6 and the display 7 are arranged outside the navigation device 1, as is shown in the drawing. In this case, loudspeaker 6 and display 7 can be parts of a hands-free device for a mobile telephone. However, it is also possible that loudspeaker 6 and display 7 are part of the navigation device 1 in order to provide for a completely autonomous navigation device 1.

The navigation device 1 is also equipped with a data input 8 which can be preferably a USB input. Via the data input 8, serial digital position information can be fed into the navigation device 1, for example, which are output signals of a GPS mouse 9, that is to say a device which combines the functions of an external satellite antenna and of an external conversion unit with one another.

If a GPS mouse 9 is not connected to the data input 8 and thus no digital position information is received, the navigation device 1 processes received signals from the internal satellite antenna 3 which are evaluated in an internal conversion unit 11 forming a part of a preprocessing unit 10 provided according to the invention and are converted into digital (serial) position information. This position information reaches an interface 12 of the central processing unit 4 as information about the current position of the navigation device 1.

If, in contrast, a GPS mouse 9 is connected to the navigation device 1 via the data input 8 and serial digital position information is thus received, a switching device 13 in the preprocessing stage 10 causes the received digital position information of the external GPS mouse 9 to now reach the serial interface 12 of the central processing unit 4 so that the position signals received from the internal satellite antenna 3 are suppressed in the preprocessing unit 10.

The switch-over by the switching device 13 is thus effected in the range of the low-frequency digital position information. The switching device 13 thus provides for the standard use of the central processing unit 4 which is only supplied with digital position information via a single interface 12 even though there are two potential sources 9; 3, 11 for this digital position information.

In the illustrative embodiment shown, the data input 8 is constructed as USB input. It can be implemented in any other suitable form, particularly also as receiver of wirelessly transmitted (serial) data signals, particularly in accordance with the Bluetooth standard.

The invention claimed is:

1. A navigation device, comprising:
a housing;
an antenna associated with said housing for receiving position signals;
an internal conversion unit for evaluating and converting received position signals received by said antenna into digital position information;
a central processing unit for receiving and processing digital position information;
a navigation interface in communication with said central processing unit;
a data input terminal to which an external receiving antenna with an external conversion unit for generating digital position information can be connected; and
a switching device in communication with said data input terminal and said internal conversion unit, said switching device having an output in communication with said central processing unit, wherein said switching device switches the output to said central processing unit to be from the data input terminal instead of the internal conversion unit when externally formed digital position information is provided by the data input terminal.

2. The navigation device according to claim 1, wherein the switching device is constructed as part of a preprocessing unit which includes the internal conversion unit.

3. The navigation device according to claim 2, wherein the data input terminal is formed by a wireless receiver for data signals.

4. The navigation device according to claim 1, wherein the data input terminal is formed by a wireless receiver for data signals.

* * * * *